Jan. 5, 1954     H. O. C. INGRAHAM ET AL     2,664,592
CONVEYER
Filed Sept. 14, 1951                          2 Sheets-Sheet 1
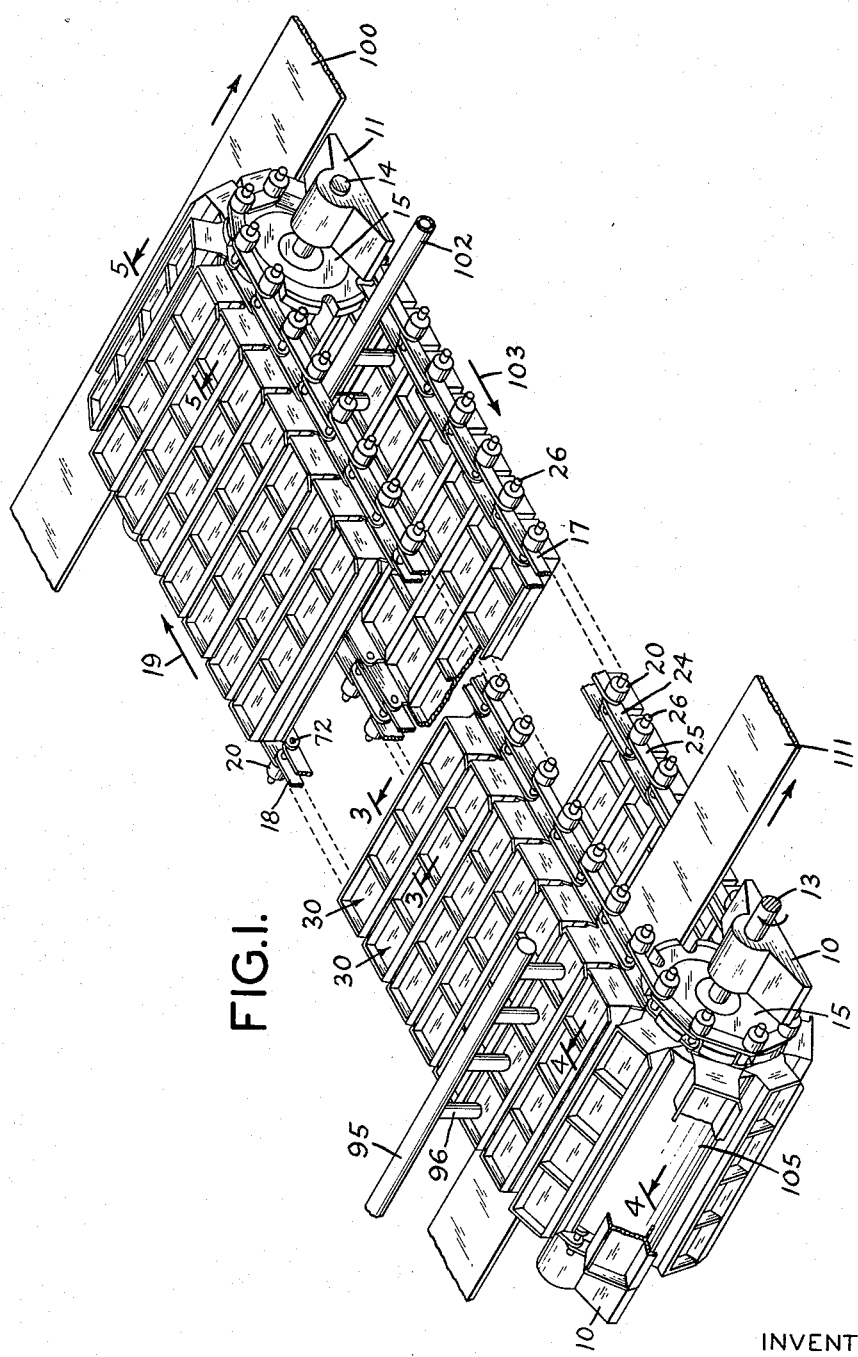
INVENTORS.
HAROLD O.C. INGRAHAM
JOHN D. SUNDY
BY
*Joseph A. Ryan*
ATTORNEY.

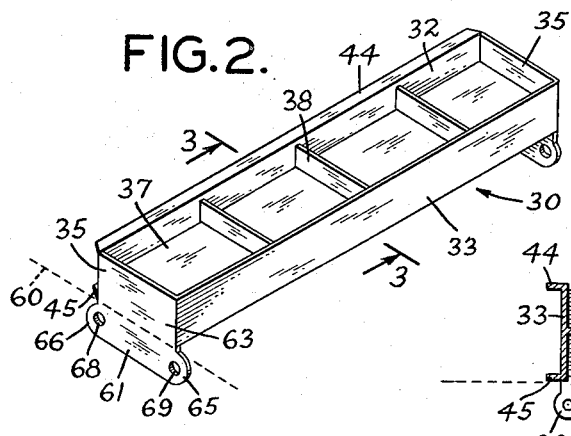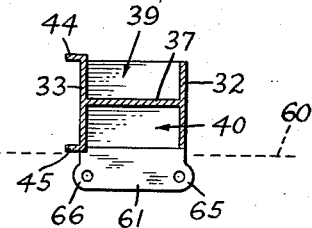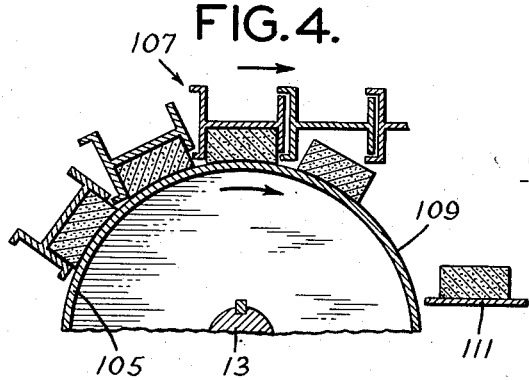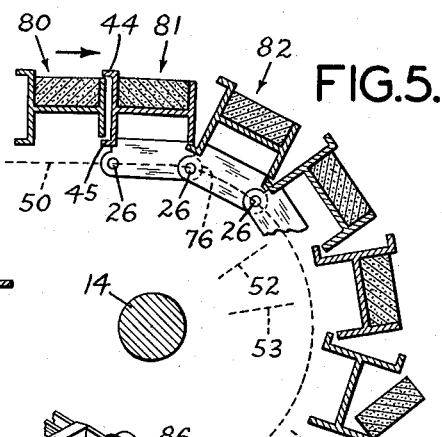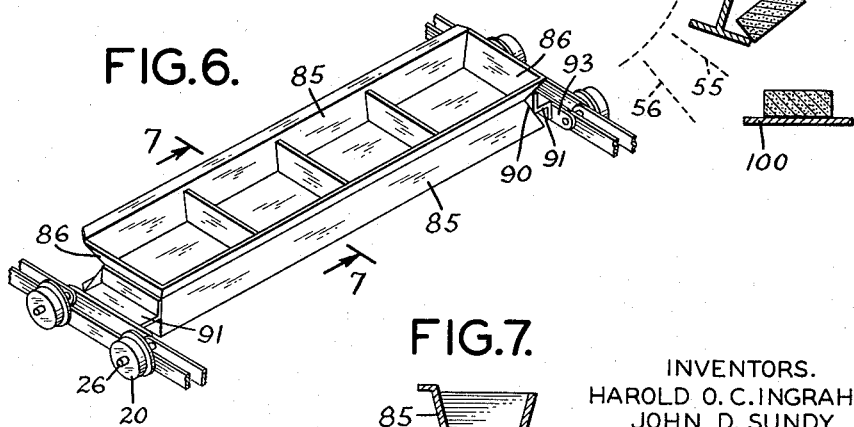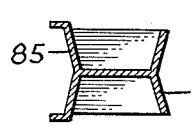

Patented Jan. 5, 1954

2,664,592

UNITED STATES PATENT OFFICE 2,664,592

CONVEYER

Harold O. C. Ingraham, Sharon, Conn., and John D. Sundy, Savannah, Ga., assignors to Allied Chemical & Dye Corporation, New York, N. Y., a corporation of New York Application September 14, 1951, Serial No. 246,684

7 Claims. (Cl. 18—26)

1

This invention relates to conveyers, and is directed more particularly to apparatus adapted to convey and facilitate solidification of solidifiable liquid material.

The invention and the objects and advantages thereof may be appreciated from consideration of the following description taken in connection with the accompanying drawings, in which Fig. 1 is an assembly view;

Fig. 2 is a perspective of a material carrying pan unit;

Fig. 3 is a transverse vertical section on the line 3—3 of Fig. 2;

Fig. 4 is a longitudinal vertical section on the line 4—4 of Fig. 1;

Fig. 5 is partly diagrammatic and partly a longitudinal vertical section on the line 5—5 of Fig. 1;

Fig. 6 is a perspective of a modified material carrying pan unit, and

Fig. 7 is a transverse vertical section on the line 7—7 of Fig. 6.

Referring to Fig. 1, the structure of the conveyer of the invention includes two pairs of main bearings 10 and 11, and main shafts 13 and 14 each carrying a pair of sprocket wheels 15 associated with an endless carrier comprising specifically two symmetrically positioned and operating endless belts indicated generally at 17 and 18. Motive power not shown may be applied to either shaft 13 or 14 to move the upper run of the conveyer in the direction of arrow 19. The apparatus may be equipped with suitably arranged longitudinally disposed tracks, not shown, which afford supports and runways for flanged rollers 20 of both the upper and lower runs. In the embodiment illustrated, the endless belts are of the chain link type, adjacent pairs of chain links 24 and 25 being connected by chain link journal pins 26 which are of such length as to provide stub shafts for rollers 20.

The invention includes provision of a particular type of material receiving pan unit one embodiment of which is shown in perspective in Fig. 2. From the exemplification of Figs. 2 and 3, it will be seen that a pan unit, indicated generally by 30, is approximately H-shaped in transverse vertical section, and comprises vertical sides 32 and 33, vertical ends 35, and a connecting horizontal plate 37, and may include partitions 38. This arrangement provides in each pan unit a pair of oppositely disposed, bottom-to-bottom material receiving compartments 39 and 40 which are such that when a given pan unit is on the upper run there is afforded an upwardly facing material compartment, and when such pan unit is on the

2 lower run an upwardly facing material receiving compartment is also provided. As shown in Figs. 2 and 3, each pan unit is equipped on the trailing side 33 with angular flanges 44 and 45, purposes of which will hereinafter appear.

A feature of the invention comprises the conjunctive relation of the structure of a pan unit and the mode of operatively attaching the same to the endless carrier. The result of this relationship is provision of a conveyer assembly having upper and lower runs the full lengths of which may be utilized for the purposes intended, while at the same time difficulties of design, construction and operation are avoided.

Fig. 5 shows diagrammatically a plurality of chain link journal pins 26. In the operation of a conveyer of the type described, it will be understood that the horizontal axes of the journal pins pass over a path indicated by the dotted line 50 which is partly horizontal, and partly semicircular in accordance with the radial dimension of sprocket wheels 15. It is noted that all inwardly extending lines e. g. 52 and 53 which are perpendicular to points of tangency on the curve of line 50 converge and tend to cross each other, while outwardly extending lines e. g. 55 and 56 which are perpendicular to point of tangency on the curve diverge and do not tend to cross each other. Thus, it will be appreciated that any adjacently positioned unitary masses of any kind, mounted either on or outside the line of curvature of line 50, on movement of the carrier diverge, separate from each other, and do not bind or interfere with each other while passing over the convex curved end of the conveyer formed by the circumference of a sprocket wheel. On the other hand, it will be understood that any similarly adjacent unitary masses mounted inwardly of the line 50, on movement of the carrier tend to contact each other and bind when passing over the concave curvature of line 50. These principles and factors apply no matter what kind of belts may be utilized to form the conveyer carrier. Hence, it may be said regardless of the particular type of belt used, whether chain link or otherwise, there is afforded by such belt a mean path of travel which may be represented by the line 50, Fig. 5.

These principles and factors are utilized in accordance with the invention to provide a double-run conveyer of structure which makes it possible to utilize the entire upper run for the conveying or treatment of one batch of material, and the entire lower run for similar handling of another batch of material, thus doubling the capacity of a conveyer of given longitudinal dimension. To attain the foregoing object, the invention provides pan units which are so associated with, connected to and supported by an endless carrier, which may be two symmetrically positioned belts of the embodiment shown or even a single properly designed belt, in such manner that a pan unit is positioned in its entirety not inwardly of the mean path of travel of the carrier.

In Fig. 2, a pan unit may be considered as that portion of Fig. 2 lying in and above a horizontal plane which includes the dotted line 60, and a feature of the invention is that a pan unit as indicated is operatively connected to a carrier in such a way that all parts of the pan unit are positioned not inwardly of the mean path of travel 50 of Fig. 5. Various modes of attachment of a pan unit to the carrier may be utilized. In the embodiment of Fig. 2 the connecting flange 61, lying below the dotted line 60, is conveniently integral and coextensive with pan unit end wall 63 all of which lies above line 60. Flange 61 is provided on either end with ears 65 and 66 drilled to afford bearings 68 and 69 which are adapted to receive and be secured to the inner ends of adjacent chain link journal pins as will be seen as at 72 of Fig. 1. It is immaterial whether a part of a connection, e. g. connecting flange 61 of Fig. 2, projects inwardly of the mean path of travel of the carrier. If such is the case, as does exist in the present embodiment, any parts of connecting means such as flange 61 which do lie inside the mean path of travel may be bent out of longitudinal alignment with adjacent parts of contiguous connections so as to overlap and avoid binding when passing over the curvature 50. Thus, ears 66 of the pan unit of Fig. 2 may be bent inwardly of the plane of the vertical ends of a pan unit so as to overlap and not bind with the adjacent ears 65 of a following pan, as shown by the dotted lines at 76, Fig. 5. While a pan unit connector, such as flange 61 of Fig. 2, may be such that the lower extremity of a pan unit may be substantially on the mean path of travel 50, the preferable construction is such, as shown in the embodiment under discussion, that a pan unit is spaced outwardly some appreciable distance from the path of travel 50.

Structural and operational advantages afforded by the invention may be appreciated from further consideration of Fig. 5. It will be seen that when particular pan units 80 and 81 are on the horizontal portion of the upper run, these units may be positioned tightly together, adjacent sides of the respective pans being contiguous and substantially in contact. Thus, flanges 44 and 45, which are on the trailing edge of pan unit 81, and which prevent passage of material fed into upper run compartments from overflowing down between adjacent units, may be short and not longer than the thickness of the vertical side of the trailing pan. As a pan unit 82 begins to pass over the curvature of path 50, it will be seen that all parts of such unit, which was formerly in close contact with the following pan unit 81 separates from pan 81, and no binding tendency is created. Also, since flanges 44 and 45 are short, there is no tendency of a lower flange 45 to heel under the edge of a following pan and tear the latter away from its mounting on journal pin 26.

Figs. 6 and 7 exemplify a modified pan unit which differs principally from the unit of Fig. 2 in that the sides 85 and the ends 86 diverge outwardly to facilitate discharge of e. g. caked material from the upper and lower compartments. In this embodiment, in view of the non-vertical ends of a pan unit as illustrated at 90, Fig. 6, the pan unit is attached to the carrier by a bracket 91 which may be welded to the pan ends and welded or riveted to a chain link 93. Alternatively, bracket 91 may be provided with ears similar to ears 65 and 66 of Fig. 2 and connected by such ears to the inner ends of the adjacent chain link journal pins.

The conveyer described may be utilized for any desired purpose. The embodiment illustrated is particularly adaptable for use as a conveyer and drier for solidifiable liquid material such as aluminum sulfate which is manufactured in an initially liquid condition, and thereafter cooled and allowed to solidify in cake form. When using the present apparatus for this purpose, a valve controlled feed pipe 95, provided with outlets 96, is positioned at the head end of the upper run and serves as a means for feeding material into the upper run compartment of a pan unit as the latter passes under pipe 95. The longitudinal length of the apparatus of Fig. 1 as a whole may be anything suitable for purposes for which the apparatus is to be employed. In the instant embodiment, the assemblage may be long enough to permit sufficient cooling and solidification of charged aluminum sulfate by the time a given pan unit reaches the far end of the upper run. If desired, air jets or other cooling means not shown may be used to hasten cooling and solidification. At the end of the upper run, solidified cake or other material is dropped out of the upper compartment of a pan unit and falls onto a conventional belt conveyer 100 for transfer to any desired point, e. g. grinding facilities. The means at the end of the upper run for discharging material from the upper compartments may be either gravity or suitable automatic knockers, not shown, arranged to facilitate dislodgment of cake or other material from the pans.

From Fig. 5 it will be seen that when a given pan unit begins to pass over the lower run, the compartment of the pan which was downwardly faced while the unit was passing over the upper run becomes upwardly faced as soon as the pan unit straightens out on the horizontal run. At this point, another charge of material may be fed into the pan unit, for example by valved pipe 102 of Fig. 1 provided with downwardly directed outlets similar to outlets 96 of feed pipe 95. As a pan unit progresses over the course of the lower run, moving in the direction of the arrow 103, cooling, solidification or other treatment takes place and is completed by the time such pan unit approaches the near end of the assemblage as shown in Fig. 1. Another feature of the invention comprises provision of simply constructed and operated means for discharging material from the lower run of the apparatus. Such means comprises an arcuate surface preferably a cylindrical drum 105, Fig. 1, which is mounted on shaft 13 and which has an axial length substantially the same as the longitudinal dimension of the pan units. Drum 105 is preferably keyed to the shaft to rotate therewith. The radial distance between the axis of shaft 13 and the outside surface of drum 105 is only slightly less than the radial distance between the axis of shaft 13 and the inside extremities of the pan units, this relationship being shown in Fig. 4. As a pan unit passes under shaft 13, the surface of the material in the upwardly facing compartment of this unit comes substantially in contact with the adjacent portion of the outer surface of drum 105. During continued upward travel of the pan unit, the face of drum 105 holds material in the pan unit compartment until the pan unit reaches approximately the point at which it begins to pass over the upper run. As illustrated in Fig. 4, material is still held in the lower compartment of pan unit 107, and at a short time interval thereafter the material is released from the pan unit and slides down over the outer surface 109 of the drum onto a conveyer belt 111 which is positioned, as shown in Figs. 4 and 1, adjacent the surface of drum 105 and between the upper and lower runs. At the lower run discharge end of the conveyer, the means for discharging material from the pan unit compartments comprises gravity or automatic knockers, not shown, similar to those described in connection with discharge of material at the end of the upper run of the conveyer.

We claim:

1. A double-run conveyer comprising an endless carrier mounted for longitudinal movement in one direction to provide an upper run and in the opposite direction to provide a lower run, a plurality of pans connected to and supported by said carrier and arranged so as to afford upwardly facing material receiving compartments on both upper and lower runs, means adjacent one end of said conveyer for feeding material into upper run pans, and a material discharge station for upper run pans adjacent the opposite end of said conveyer, means adjacent said opposite end for feeding material into lower run pans, and means to prevent discharge of material from a lower run pan until such pan is approximately in position to begin to pass over the upper run.

2. A double-run conveyer comprising an endless carrier mounted for longitudinal movement in one direction to provide an upper run and in the opposite direction to provide a lower run, a plurality of pan units each connected to and supported by said carrier and arranged each so as to afford an upwardly facing material receiving compartment on both upper and lower runs, means adjacent one end of said conveyer for feeding material into upper run compartments, and a material discharge station for upper run compartments adjacent the opposite end of said conveyer; means adjacent said opposite end for feeding material into lower run compartments, and means to prevent discharge of material from a lower run compartment until the pan unit thereof is approximately in position to begin to pass over the upper run.

3. A double-run conveyer comprising an endless carrier mounted for longitudinal movement in one direction to provide an upper run and in the opposite direction to provide a lower run, said carrier being arranged to move over a mean path of travel including a convexity, a plurality of pan units each having at least a pair of oppositely disposed material receiving compartments to afford an upwardly facing material receiving compartment on both upper and lower runs, each pan unit being connected to and supported by said carrier in such manner that each pan unit is positioned wholly on the convex side of the mean path of travel of said carrier, means adjacent one end of said conveyer for feeding material into upper run compartments, and a material discharge station for upper run compartments adjacent the opposite end of said conveyer; means adjacent said opposite end for feeding material into lower run compartments, and means to prevent discharge of material from a lower run compartment until the pan unit thereof is approximately in position to begin to pass over the upper run.

4. A double-run conveyer comprising an endless carrier mounted for longitudinal movement in one direction to provide an upper run and in the opposite direction to provide a lower run, a plurality of pan units each having at least a pair of oppositely disposed, bottom-to-bottom material receiving compartments, said bottoms lying in general parallel relation to the mean path of travel of said carrier whereby each pan unit affords an upwardly facing material receiving compartment on both upper and lower runs, each pan unit being connected to and supported by said carrier in such manner that each pan unit is positioned outwardly of the mean path of travel of said carrier, means adjacent one end of said conveyer for feeding solidifiable liquid material into upper run compartments, and a solid material discharge station for upper run compartments adjacent the opposite end of said conveyer, means adjacent said opposite end for feeding solidifiable liquid material into lower run compartments, and means to prevent discharge of solid material from a lower run compartment until the pan unit thereof is approximately in position to begin to pass over the upper run.

5. A double-run conveyor comprising a carrier including a plurality of symmetrically positioned endless chain link belts having transverse chain link journal pins, said belts being mounted for longitudinal movement in one direction to provide an upper run and in the opposite direction to provide a lower run, a plurality of transversely arranged pan units each having at least a pair of oppositely disposed, bottom-to-bottom material receiving compartments, the bottom of each compartment lying in general parallel relation to said belts whereby each pan unit affords an upwardly facing material receiving compartment on both upper and lower runs, each end of each pan unit being connected to and supported by a belt in such manner that each pan unit is positioned outwardly of the mean paths of travel of said belts, means adjacent one end of said conveyor for feeding solidifiable liquid material into upper run compartments, and a solid material discharge station for upper run compartments adjacent the opposite end of said conveyor, means adjacent said opposite end for feeding solidifiable liquid material into lower run compartments, and means including an arcuate surface closely approaching the tops of lower run compartments adjacent the first mentioned end of the conveyor to prevent discharge of solid material from a lower run compartment until the pan unit thereof is approximately in position to begin to pass over the upper run.

6. A double-run conveyor comprising a carrier including a plurality of symmetrically positioned endless chain link belts having transverse chain link journal pins, said belts being mounted for longitudinal movement in one direction to provide an upper run and in the opposite direction to provide a lower run, a plurality of transversely arranged contiguous pan units each having at least a pair of oppositely disposed, bottom-to-bottom material receiving compartments, the bottom of each compartment lying in general parallel relation to said belts whereby each pan unit affords an upwardly facing material receiving compartment on both upper and lower runs, each end of each pan unit being connected to and supported by adjacent belt journal pins in such manner that each pan unit is positioned outwardly of the mean paths of travel of the axes of said journal pins, means adjacent one end of said conveyor for feeding solidifiable liquid material into upper run compartments, and a solid material discharge station for upper run compartments adjacent the opposite end of said conveyor, means adjacent said opposite end for feeding solidifiable liquid material into lower run compartments, and means including a drum rotatable with said belts and having the cylindrical outer surface closely approaching the tops of lower run compartments adjacent the first mentioned end of the conveyor to prevent discharge of solid material from a lower run compartment until the pan unit thereof is approximately in position to begin to pass over the upper run.

7. A conveyor comprising a longitudinally movable carrier including a plurality of symmetrically positioned endless belts, a plurality of transversely arranged contiguous pan units each having at least a pair of oppositely disposed, bottom-to-bottom material receiving compartments, the bottom of each compartment lying in general parallel relation to said belts and the trail edge of each compartment overlapping the advance edge of each following contiguous compartment, and means attached to each end of each pan unit and connected to and supported by a belt, said means being constructed and arranged in such manner that each pan unit is positioned substantially outwardly of the mean paths of travel of said belts.

HAROLD O. C. INGRAHAM.
JOHN D. SUNDY.

References Cited in the file of this patent
UNITED STATES PATENTS

| Number | Name | Date |
|---|---|---|
| 941,792 | Meeker | Nov. 30, 1909 |
| 993,321 | Coddington | May 23, 1911 |
| 1,413,870 | Paley | Apr. 25, 1922 |